United States Patent
Tachibana (10) Patent No.: US 12,378,139 B2
(45) Date of Patent: Aug. 5, 2025

(54) ELECTROLYTIC UNIT

(71) Applicant: NIHON TRIM CO., LTD., Osaka (JP)

(72) Inventor: Takahito Tachibana, Nankoku (JP)

(73) Assignee: NIHON TRIM CO., LTD., Osaka (JP)

( * ) Notice: Subject to any disclaimer, the term of this patent is extended or adjusted under 35 U.S.C. 154(b) by 589 days.

(21) Appl. No.: 17/637,937

(22) PCT Filed: Jul. 28, 2020

(86) PCT No.: PCT/JP2020/028882
§ 371 (c)(1),
(2) Date: Feb. 24, 2022

(87) PCT Pub. No.: WO2021/039247
PCT Pub. Date: Mar. 4, 2021

(65) Prior Publication Data
US 2022/0281761 A1 Sep. 8, 2022

(30) Foreign Application Priority Data
Aug. 26, 2019 (JP) .................................. 2019-153655

(51) Int. Cl.
*C02F 1/461* (2023.01)

(52) U.S. Cl.
CPC .............. *C02F 1/46104* (2013.01); *C02F 2201/46115* (2013.01); *C02F 2201/4618* (2013.01)

(58) Field of Classification Search
CPC ... C25B 9/73; C25B 9/77; C02F 2201/46115; C02F 1/46104; C02F 2201/4618; C02F 1/4618
See application file for complete search history.

(56) References Cited

U.S. PATENT DOCUMENTS

| | | | | |
|---|---|---|---|---|
| 3,402,117 A | * | 9/1968 | Evans | ........................ C25B 9/77 204/290.06 |
| 6,132,572 A | | 10/2000 | Kim | |
| 6,328,863 B1 | * | 12/2001 | Wilhelm | ................... C25B 9/77 204/255 |
| 2011/0210012 A1 | | 9/2011 | Sioli | |
| 2014/0202849 A1 | | 7/2014 | Halterman | |

FOREIGN PATENT DOCUMENTS

| | | |
|---|---|---|
| JP | H01-100289 A | 4/1989 |
| JP | H02-125888 A | 5/1990 |
| JP | H08-173970 A | 7/1996 |
| JP | 2007-270292 A | 10/2007 |
| JP | 2012-506946 A | 3/2012 |
| JP | 2013-166988 A | 8/2013 |
| JP | 2018-114445 A | 7/2018 |

* cited by examiner

*Primary Examiner* — Ciel P Contreras
(74) *Attorney, Agent, or Firm* — Muncy, Geissler, Olds & Lowe, P.C.

(57) ABSTRACT

An electrolytic unit includes at least a plurality of electrolytic cells for electrolyzing water. Each of the electrolytic cells includes a case for defining an electrolytic chamber therein and a diaphragm for dividing the electrolytic chamber into an anode chamber on an anode side and a cathode chamber on a cathode side. The plurality of the electrolytic cells forms a stack in which the electrolytic cells are stacked in a normal direction of the diaphragms with the orientations of the diaphragms aligned with each other.

16 Claims, 7 Drawing Sheets

FIG.7 ic unit
ELECTROLYTIC UNIT

FIELD OF THE INVENTION

The present invention relates to an electrolytic unit including a plurality of electrolytic cells for electrolyzing water.

BACKGROUND OF THE INVENTION

Conventionally, an electrolytic unit including a plurality of electrolytic cells has been suggested (for example, refer to Patent Literature 1).

CITATION LIST

Patent Literature

Patent Literature 1: Japanese Unexamined Patent Application Publication No. 2018-114445

SUMMARY OF THE INVENTION

Technical Problem

In the electrolytic unit disclosed in Patent Literature 1 described above, each electrolytic cell is independently provided, and a supply pipe and a discharge pipe are attached between each pair of the electrolytic cells.

However, in the layout of the above-described electrolytic cells, the electrolytic unit becomes voluminous, which makes it difficult to achieve a decrease in size of an electrolytic water production device.

The present invention was devised in view of the circumstances as described above, and a primary object thereof is to provide an electrolytic unit capable of easily achieving a decrease in size of an electrolytic water production device.

Means for Solving the Problem

The present invention is an electrolytic unit including a plurality of electrolytic cells for electrolyzing water, wherein each of the electrolytic cells includes a case for defining an electrolytic chamber therein and a diaphragm for dividing the electrolytic chamber into an anode chamber on an anode side and a cathode chamber on a cathode side, and the plurality of the electrolytic cells forms a stack in which the electrolytic cells are stacked in a normal direction of the diaphragms with the orientations of the diaphragms aligned with each other.

In the electrolytic unit according to the present invention, it is preferred that the cases of the plurality of the electrolytic cells are in contact with each other.

In the electrolytic unit according to the present invention, it is preferred that each of the electrolytic cells is integrally fixed together by bolts penetrating through each of the electrolytic cells in the normal direction.

In the electrolytic unit according to the present invention, it is preferred that the case includes a first case piece for defining the anode chamber and a second case piece for defining the cathode chamber, and the first case piece of one of the electrolytic cells adjacent to each other in the normal direction and the second case piece of the other one of the electrolytic cells are fixed to each other.

In the electrolytic unit according to the present invention, it is preferred that each of the first case pieces has formed therein a first supply port for supplying water for electrolysis to the anode chamber and a first discharge port for taking out electrolyzed water from the anode chamber, each of the first supply ports is arranged on a straight line in the normal direction, and each of the first discharge ports is arranged on a straight line in the normal direction.

In the electrolytic unit according to the present invention, it is preferred that each of the first supply ports is communicated with one another by a first supply pipe extending in the normal direction, and the first supply pipe is composed of a plurality of first pipe pieces, which are provided in each of the first case pieces and communicated with each of the first supply ports, connected in the normal direction.

In the electrolytic unit according to the present invention, it is preferred that each of the first discharge ports is communicated with one another by a first discharge pipe extending in the normal direction, and the first discharge pipe is composed of a plurality of second pipe pieces, which are provided in each of the first case pieces and communicated with each of the first discharge ports, connected in the normal direction.

In the electrolytic unit according to the present invention, it is preferred that each of the second case pieces has formed therein a second supply port for supplying water for electrolysis to the cathode chamber and a second discharge port for taking out electrolyzed water from the cathode chamber, each of the second supply ports is arranged on a straight line in the normal direction, and each of the second discharge ports is arranged on a straight line in the normal direction.

In the electrolytic unit according to the present invention, it is preferred that each of the second supply ports is communicated with one another by a second supply pipe extending in the normal direction, and the second supply pipe is composed of a plurality of third pipe pieces, which are provided in each of the second case pieces and communicated with each of the second supply ports, connected in the normal direction.

In the electrolytic unit according to the present invention, it is preferred that each of the second discharge ports is communicated with one another by a second discharge pipe extending in the normal direction, and the second discharge pipe is composed of a plurality of fourth pipe pieces, which are provided in each of the second case pieces and communicated with each of the second discharge ports, connected in the normal direction.

In the electrolytic unit according to the present invention, it is preferred that a reinforcing member is attached to an outer end face of the first case piece on one side in the normal direction and an outer end face of the second case piece on the other side in the normal direction.

It is preferred that the electrolytic unit according to the present invention further includes a first fixing member extending in the normal direction and pressing to fix each of the first pipe pieces and each of the second pipe pieces to each of the first case pieces.

It is preferred that the electrolytic unit according to the present invention further includes a second fixing member extending in the normal direction and pressing to fix each of the third pipe pieces and each of the fourth pipe pieces to each of the second case pieces.

Advantageous Effects of the Invention

In the electrolytic unit according to the present invention, the plurality of the electrolytic cells forms the stack in which the electrolytic cells are stacked in the normal direction of the diaphragms with the orientations of the diaphragms aligned with each other. Thereby, the space between the electrolytic cells adjacent to each other is shortened, therefore, the length of the electrolytic unit in the normal direction is suppressed. Thereby, it is possible that a decrease in size of the electrolytic water production device is easily achieved.

DETAILED DESCRIPTION OF THE INVENTION

In the following, one embodiment of the present invention will now be described in conjunction with accompanying drawings.

Figure 1:
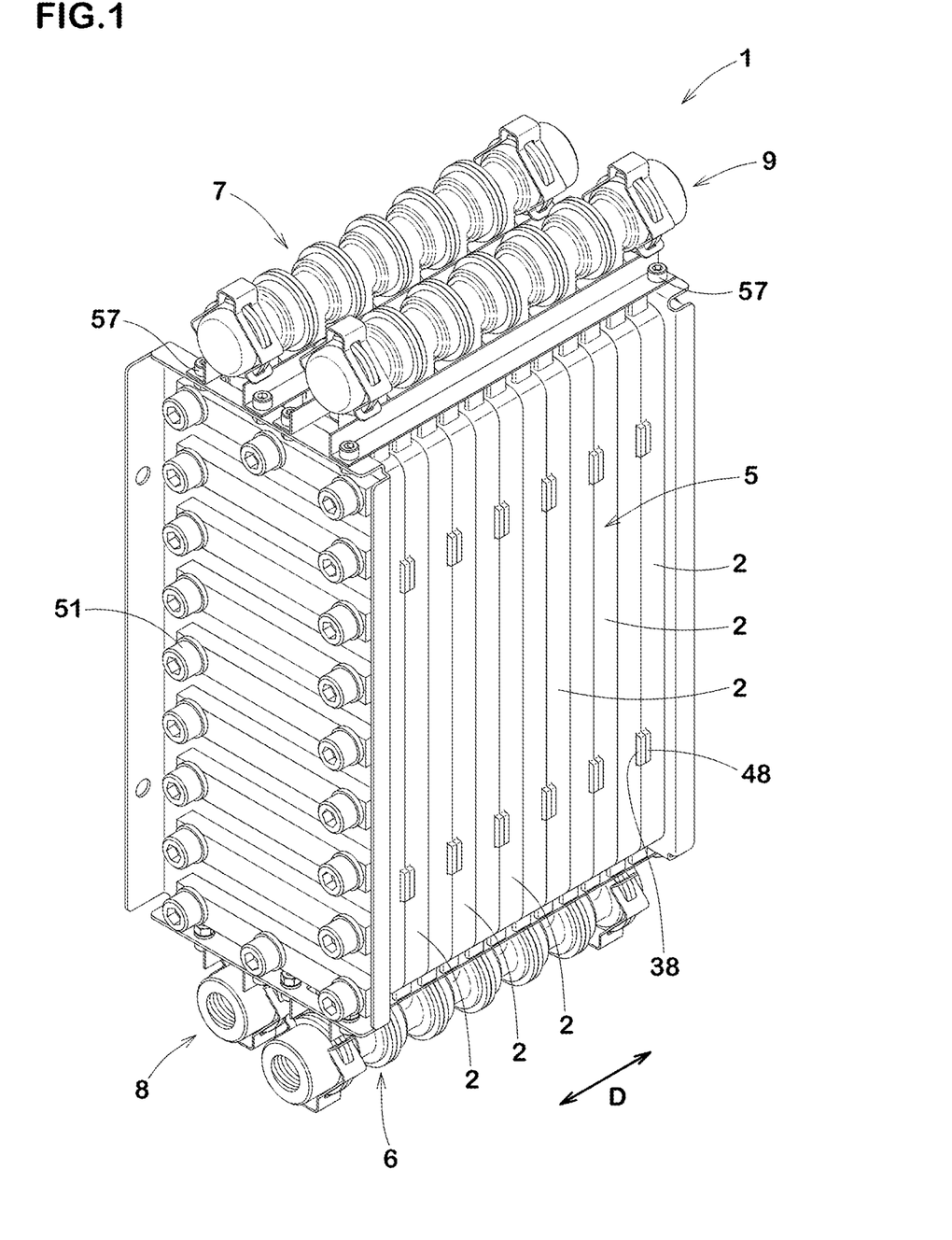
FIG. 1 is a perspective view showing the schematic configuration of an electrolytic unit of the present invention.
Figure 2:
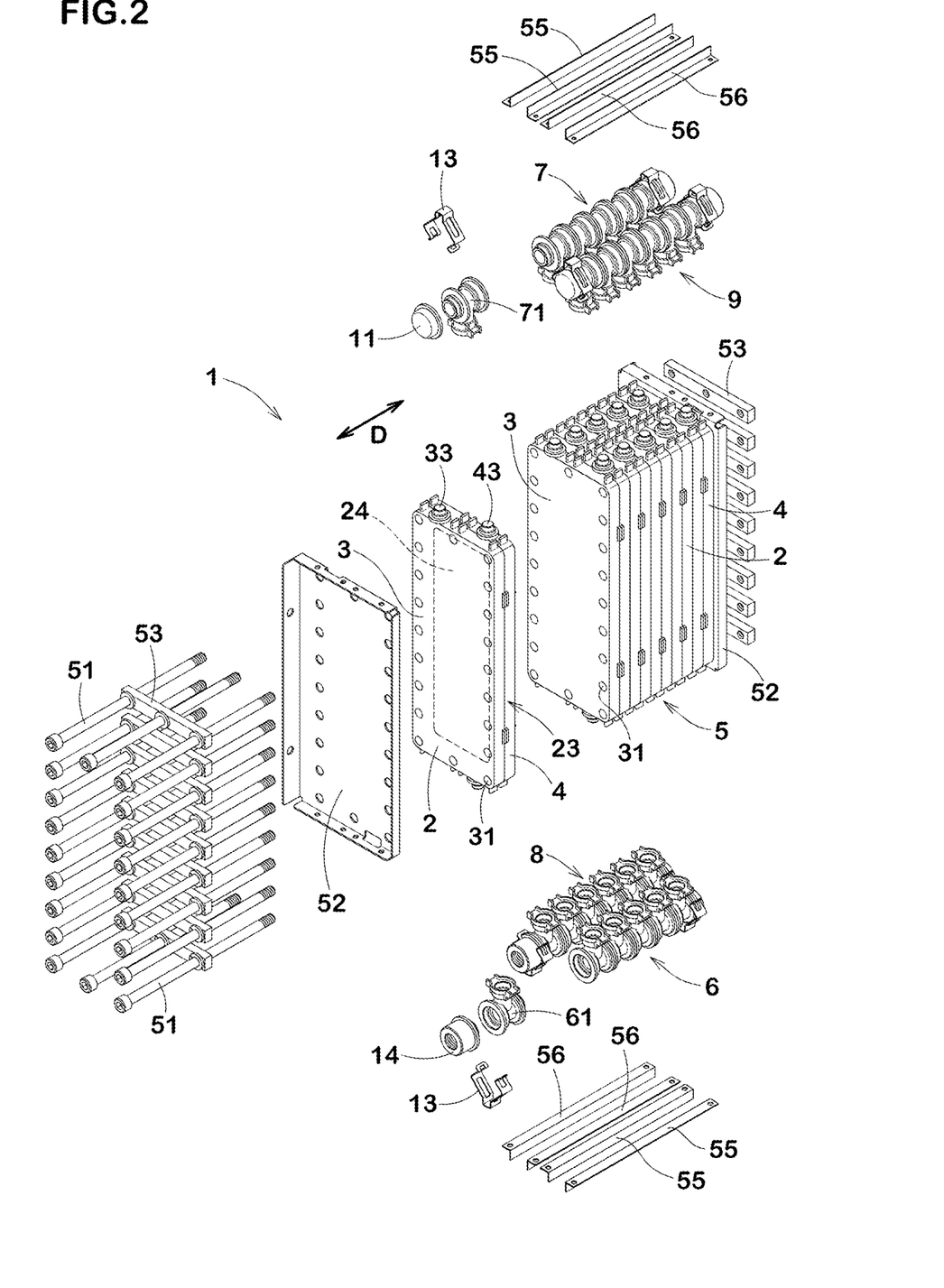
FIG. 2 is an exploded view of the electrolysis unit.

FIG. 1 and FIG. 2 depict the configuration of an electrolytic unit 1 of the present embodiment. The electrolytic unit 1 includes a plurality of electrolytic cells 2 for electrolyzing water. It is possible that the electrolytic unit 1 configured as such produces a large amount of electrolytic water in a short period of time, which is suitable for use of electrolytic water in electrolytic water dialysis treatment for a large number of people, and for use in the field of agriculture and so forth. And, one electrolytic water production device may be composed of a plurality of the electrolytic unit 1 and the like.

In the present embodiment, the electrolytic unit 1 is configured by six electrolytic cells 2 and the like. The number of the electrolytic cells 2 is not particularly limited as long as it is two or more. Therefore, the number of the electrolytic cells 2 is adjusted in accordance with the amount of electrolytic water required per unit time.

Figure 3:
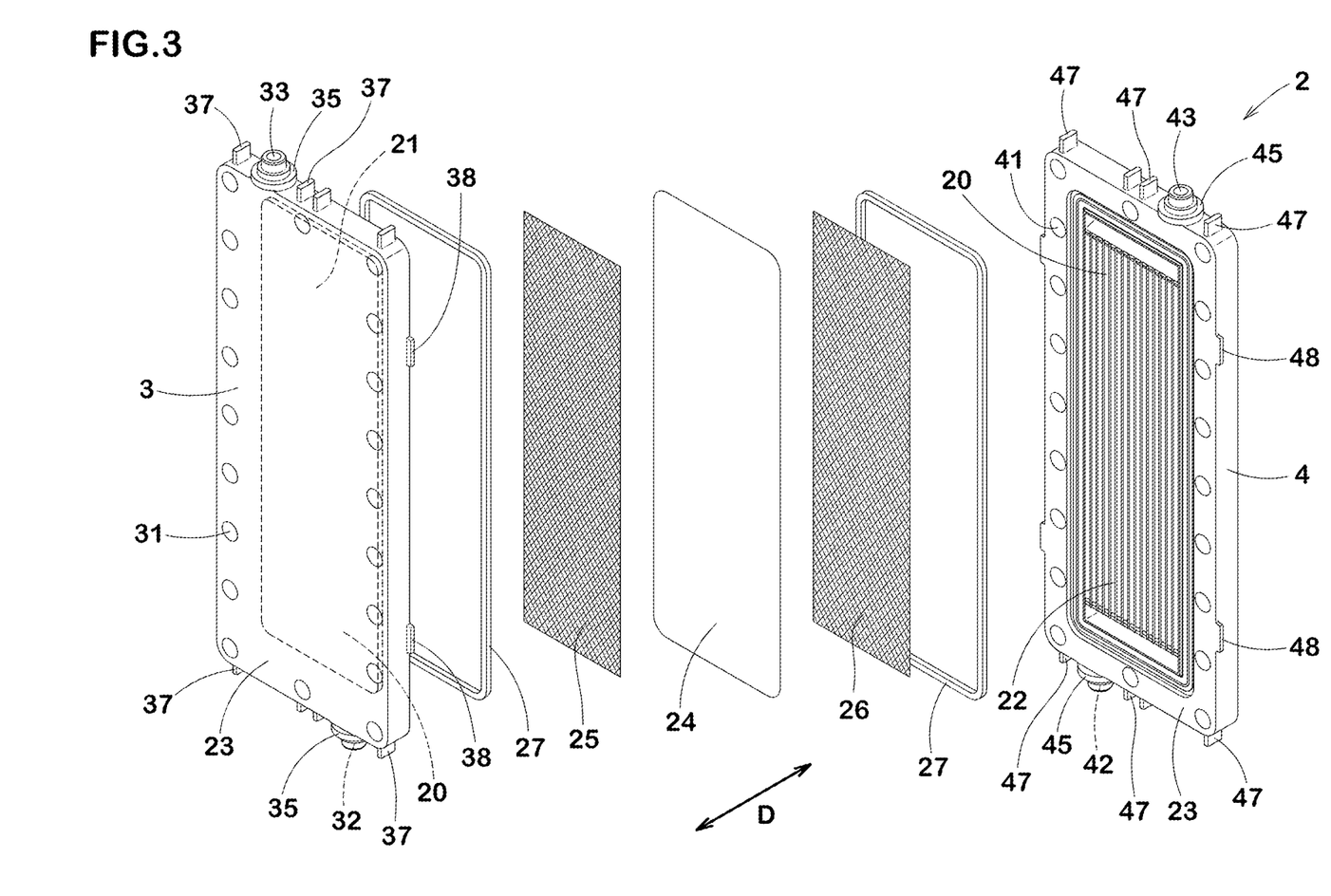
FIG. 3 is an exploded view of one of electrolytic cells constituting the electrolysis unit.
Figure 4:
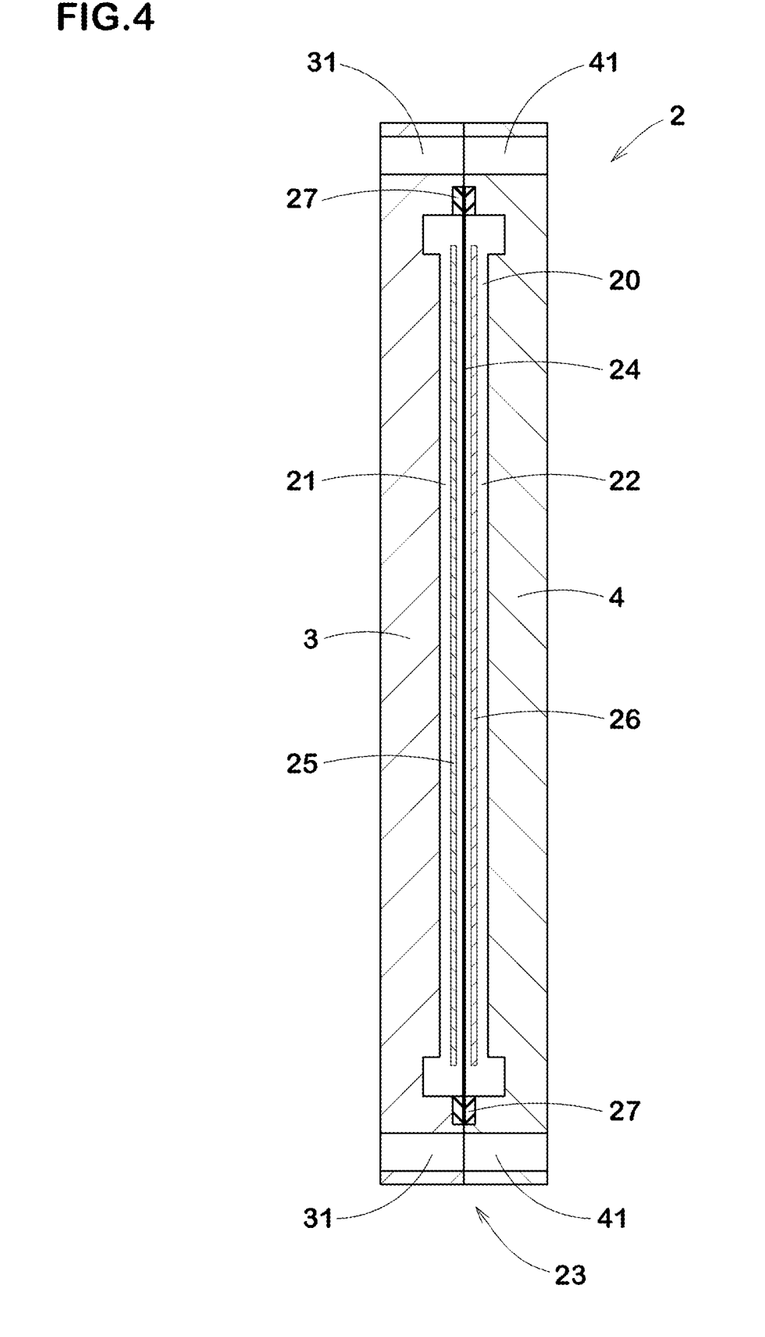
FIG. 4 is a cross-sectional view of one of the electrolytic cells.

FIG. 3 and FIG. 4 depict the configuration of one of the electrolytic cells 2. Each of the electrolytic cells 2 includes a case 23 for defining an electrolytic chamber 20 therein and a diaphragm 24 for dividing the electrolytic chamber 20 into an anode chamber 21 on an anode side and a cathode chamber 22 on a cathode side.

As depicted in FIGS. 1 and 2, the plurality of the electrolytic cells 2 are disposed so that orientations of the respective diaphragms 24 are mutually aligned, that is, normal directions (D) of the respective diaphragms 24 match. And, the electrolytic cells 2 are stacked in the normal direction (D) of the diaphragms 24. Therefore, the plurality of the electrolytic cells 2 form a stack 5. With this, the space between the electrolytic cells 2 adjacent to each other is shortened, therefore, the length of the electrolytic unit 1 in the normal direction (D) is suppressed, thereby, it is possible that a decrease in size of the electrolytic water production device is easily achieved.

In the present electrolytic unit 1, it is preferred that the cases 23 of the plurality of electrolytic cells 2 adjacent to each other in the normal direction (D) of the diaphragms 24 are in contact with each other. With this, the electrolytic cells 2 adjacent to each other are in close contact without a gap, therefore, it is possible that the space between the electrolytic cells 2 adjacent to each other is more shortened. Further, since water pressure in the normal direction (D) between the electrolytic cells 2 adjacent to each other are cancelled out, it is possible that the thickness of the case 23 is set to be thin, therefore, it is possible that a decrease in size of the electrolytic unit 1 is easily achieved. It should be noted that the electrolytic cells 2 may be stacked via a bush, spacer, or the like therebetween.

In the present electrolytic unit 1, the electrolytic cells 2 are integrally fixed by bolts 51. The bolts 51 penetrate through the electrolytic cells 2 in the normal direction (D). This facilitates assembling and disassembling the electrolytic unit 1, and facilitates maintenance of the electrolytic cells 2. For example, it is possible to easily remove a defective electrolytic cell 2 and replace it with a new electrolytic cell 2.

As depicted in FIGS. 3 and 4, the case 23 includes a first case piece 3 for defining the anode chamber 21 and a second case piece 4 for defining the cathode chamber 22. The first case piece 3 and the second case piece 4 are formed of resin such as ABS (acrylonitrile butadiene styrene) or PPS (polyphenylene sulfide), for example.

The first case piece 3 and the second case piece 4 are each formed in a rectangular shape when viewed in the normal direction (D). The first case piece 3 and the second case piece 4 are provided with through holes 31 and 41 for letting the bolts 51 be inserted thereinto. The through holes 31 are formed in an outer peripheral part of the first case piece 3 with appropriate spacing. On the other hand, the through holes 41 are formed in an outer peripheral part of the second case piece 4 with appropriate spacing.

In the present embodiment, the first case piece 3 of one of the electrolytic cells 2 adjacent to each other in the normal direction (D) and the second case piece 4 of the other electrolytic cell 2 are arranged in a back-to-back manner and fixed together. The back-to-back arrangement is an arrangement in which the back surface of the first case piece 3 (an end face in the normal direction (D) on a side where the anode chamber 21 is not formed) and the back surface of the second case piece 4 (an end face in the normal direction (D) on a side where the cathode chamber 22 is not formed) are opposed to each other. Thereby, the anode chambers 21 and the cathode chambers 22 are alternately disposed in the normal direction (D).

The electrolytic chamber 20 has the diaphragm 24, an anode power feeder 25, and a cathode power feeder 26 arranged therein. The diaphragm 24, the anode power feeder 25, and the cathode power feeder 26 are each formed in a rectangular shape. The anode power feeder 25 is disposed in the anode chamber 21, and the cathode power feeder 26 is disposed in the cathode chamber 22.

The diaphragm 24 is disposed between the anode power feeder 25 and the cathode power feeder 26. That is, the anode power feeder 25 is disposed on one side of the diaphragm 24 and the cathode power feeder 26 is disposed on the other side thereof. The anode power feeder 25 and the cathode power feeder 26 are each connected to a power feeding terminal (not depicted) for applying DC voltage. The power feeding terminal on the anode side and the cathode side partly protrudes outside the case 23 to be connected to a power supply circuit or the like. Water is supplied to both of the anode chamber 21 and the cathode chamber 22 of the electrolytic chamber 20 and, with DC voltage being applied to the anode power feeder 25 and the cathode power feeder 26, electrolysis of water occurs in the electrolytic chamber 20.

The diaphragm 24 is formed in a rectangular shape substantially similar to those of the first case piece 3 and the second case piece 4. The diaphragm 24 lets ions generated by electrolysis pass therethrough, thereby, the anode power feeder 25 and the cathode power feeder 26 are electrically connected via the diaphragm 24. For the diaphragm 24, a solid polymer material made of a fluorine-based resin material having a sulfonic acid base is used, for example.

In the electrolytic cell 2 having the diaphragm 24 using the solid polymer material, neutral electrolytic hydrogen water and electrolytic oxygen water are produced. With water electrolyzed in the electrolytic chamber 20, electrolytic hydrogen water with hydrogen gas dissolved therein is obtained in the cathode chamber 22, and electrolytic oxygen water with oxygen gas dissolved therein is obtained in the anode chamber 21. Electrolytic hydrogen water produced in the cathode chamber 22 has attracted attention because it removes active oxygen generated at the time of hemodialysis treatment and is suitable for relieve oxidative stress of patients. Further, in the field of agriculture, electrolytic hydrogen water has attracted attention because an increase in yield per unit area and cultivation of high-functionality crops with high nutritional value can be expected.

The anode power feeder 25 and the cathode power feeder 26 are each configured so as to allow water to flow back and forth in a plate-thickness direction. As the anode power feeder 25 and the cathode power feeder 26, meshed metal such as expanded metal can be used, for example. It is possible that the meshed anode power feeder 25 and the meshed cathode power feeder 26 configured as such let water spread over the surface of the diaphragm 24 while sandwiching the diaphragm 24 therebetween, thereby, electrolysis in the electrolytic chamber 20 is promoted. In the present embodiment, expand metals made of titanium covered with a platinum-plated layer formed on the surface thereof are used as the anode power feeder 25 and the cathode power feeder 26, for example. The platinum-plated layer prevents oxidation of titanium.

Outside of the outer peripheral edge of each of the anode power feeder 25 and the cathode power feeder 26, a sealing member 27 for preventing water leakage from a mating face between the first case piece 3 and the second case piece 4 is provided. The sealing member 27 is provided on each side of the diaphragm 24. The outer peripheral part of the diaphragm 24 is sandwiched by the sealing members 27.

Each of the first case pieces 3 has formed therein a first supply port 32 for supplying water for electrolysis to the anode chamber 21 and a first discharge port 33 for taking out electrolyzed water from the anode chamber 21. The first supply port 32 is formed in one of side walls extending along a short-length direction of the first case piece 3, and communicates with the anode chamber 21. The first discharge port 33 is formed in the other side wall extending along the short-length direction of the first case piece 3, and communicates with the anode chamber 21.

Each of the second case pieces 4 has formed therein a second supply port 42 for supplying water for electrolysis to the cathode chamber 22 and a second discharge port 43 for taking out electrolyzed water from the cathode chamber 22. The second supply port 42 is formed in one of side walls extending along a short-length direction of the second case piece 4, and communicates with the cathode chamber 22. The second discharge port 43 is formed in the other side wall extending along the short-length direction of the second case piece 4, and communicates with the cathode chamber 22.

As can be understood from FIGS. 2 and 3, when the electrolytic cells 2 are stacked along the normal direction (D), the first supply ports 32 are each disposed on a straight line extending in the normal direction of the diaphragm 24. Similarly, the first discharge ports 33 are each disposed on a straight line extending in the normal direction of the diaphragm 24. Thereby, the first supply ports 32 and the first discharge ports 33 are arranged in an orderly manner.

Further, when the electrolytic cells 2 are stacked along the normal direction (D), the second supply ports 42 are each disposed on a straight line extending in the normal direction of the diaphragm 24. Similarly, the second discharge ports 43 are each disposed on a straight line extending in the normal direction of the diaphragm 24. Thereby, the second supply ports 42 and the second discharge ports 43 are arranged in an orderly manner.

Figure 5:
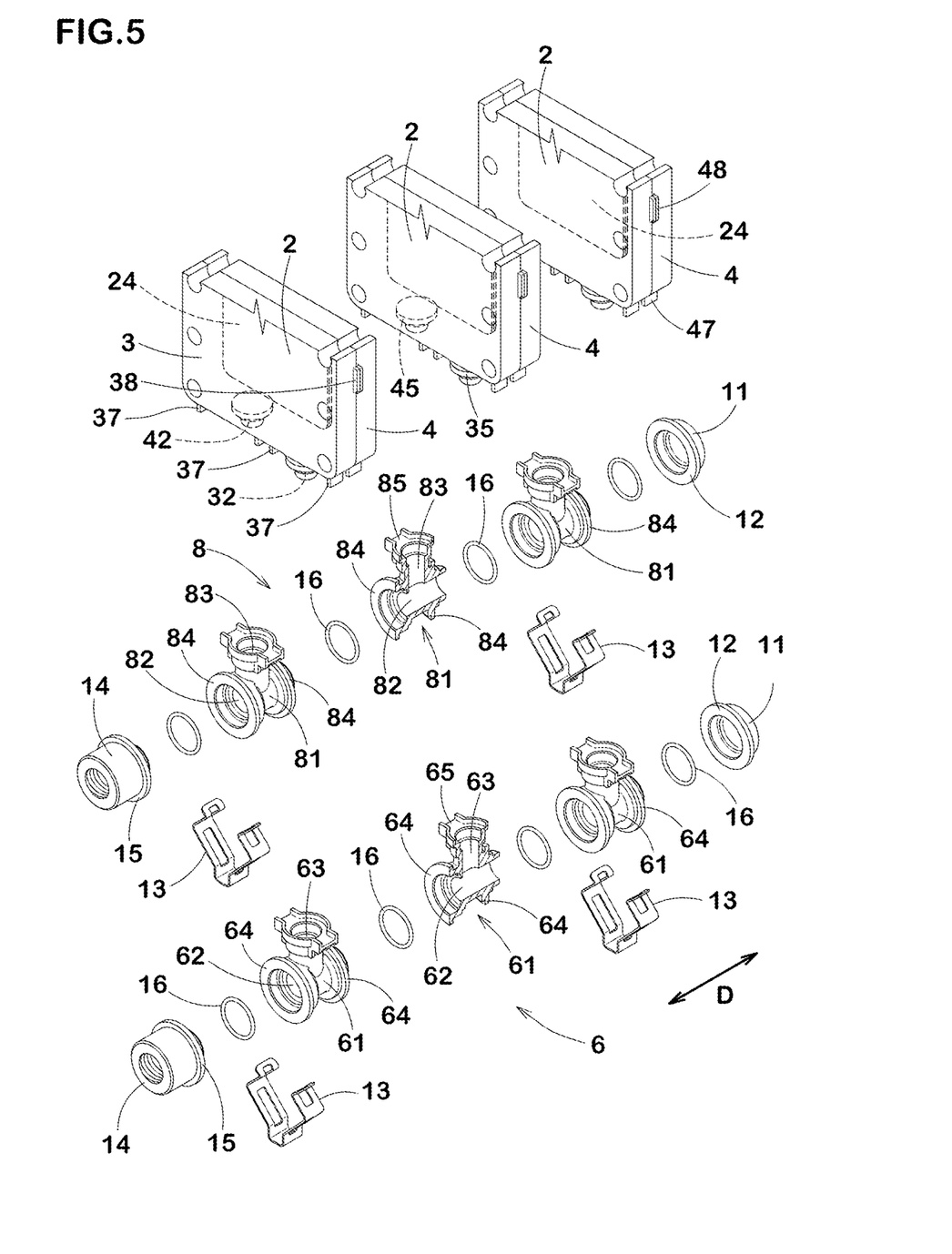
FIG. 5 shows exploded views of a first supply pipe and a second supply pipe.

FIG. 5 depicts the configurations of a first supply pipe 6 and a second supply pipe 8 disposed at a lower part of the electrolytic unit 1. In the drawing, an embodiment is shown in which three electrolytic cells 2 are stacked.

As shown in FIGS. 2 and 5, the first supply ports 32 of the electrolytic cells 2 are made communicating with one another by the first supply pipe 6 extending in the normal direction (D) of the diaphragm 24. The first supply pipe 6 is composed of a plurality of first pipe pieces 61 connected together in the normal direction (D).

Each of the first pipe pieces 61 has a main body part 62 extending in the normal direction (D) of the diaphragm 24 and a branch part 63 extending in parallel to an in-plane direction of the diaphragm 24. The inside of the main body part 62 and the inside of the branch part 63 are each formed in a pipe shape and communicate with each other. The length of the main body part 62 is set in accordance with the thickness of the electrolytic cell 2. The plurality of the first pipe pieces 61 are connected in the normal direction (D), therefore, the interiors of the main body parts 62 communicate in the normal direction (D). The main body part 62 is provided at both ends thereof in the normal direction (D) with flanges 64 protruding outward from the main body part 62, and by the flanges 64 of adjacent first pipe pieces 61 being in contact with each other, the first pipe pieces 61 are connected together to form the first supply pipe 6.

Each of the first supply pipes 6 is attached to a respective one of the first case pieces 3 so that the branch part 63 of the first pipe piece 61 communicates with the first supply port 32. Thereby, the first supply port 32 and the main body part 62 of the first supply pipe 6 communicate with each other.

To one end of the first supply pipe 6, a lid member 11 for closing the one end of the first supply pipe 6 is attached. The lid member 11 is provided with a flange 12 at an end edge on a first pipe piece 61 side. With the flange 12 of the lid member 11 brought into contact with the flange 64 of the first pipe piece 61 on one end side of the first supply pipe 6, the lid member 11 is attached to the first supply pipe 6, and then fixed to the first pipe piece 61 by a clip 13. The clip 13 integrally holds the flange 12 and the flange 64.

To the other end of the first supply pipe 6, a joint member 14 for connecting the first supply pipe 6 to a pipe extending from a water supply source is attached. The joint member 14 is provided with a flange 15 at an end edge on a first pipe piece 61 side. With the flange 15 of the joint member 14 brought into contact with the flange 64 of the first pipe piece 61 on the other end side of the first supply pipe 6, the joint member 14 is attached to the first supply pipe 6, and then fixed to the first pipe piece 61 by the clip 13. The clip 13 integrally holds the flange 15 and the flange 64. It should be noted that a sealing member 16 such as an O ring, for example, is attached between the first pipe pieces 61, between the first pipe piece 61 and the lid member 11, and between the first pipe piece 61 and the joint member 14.

Figure 6:
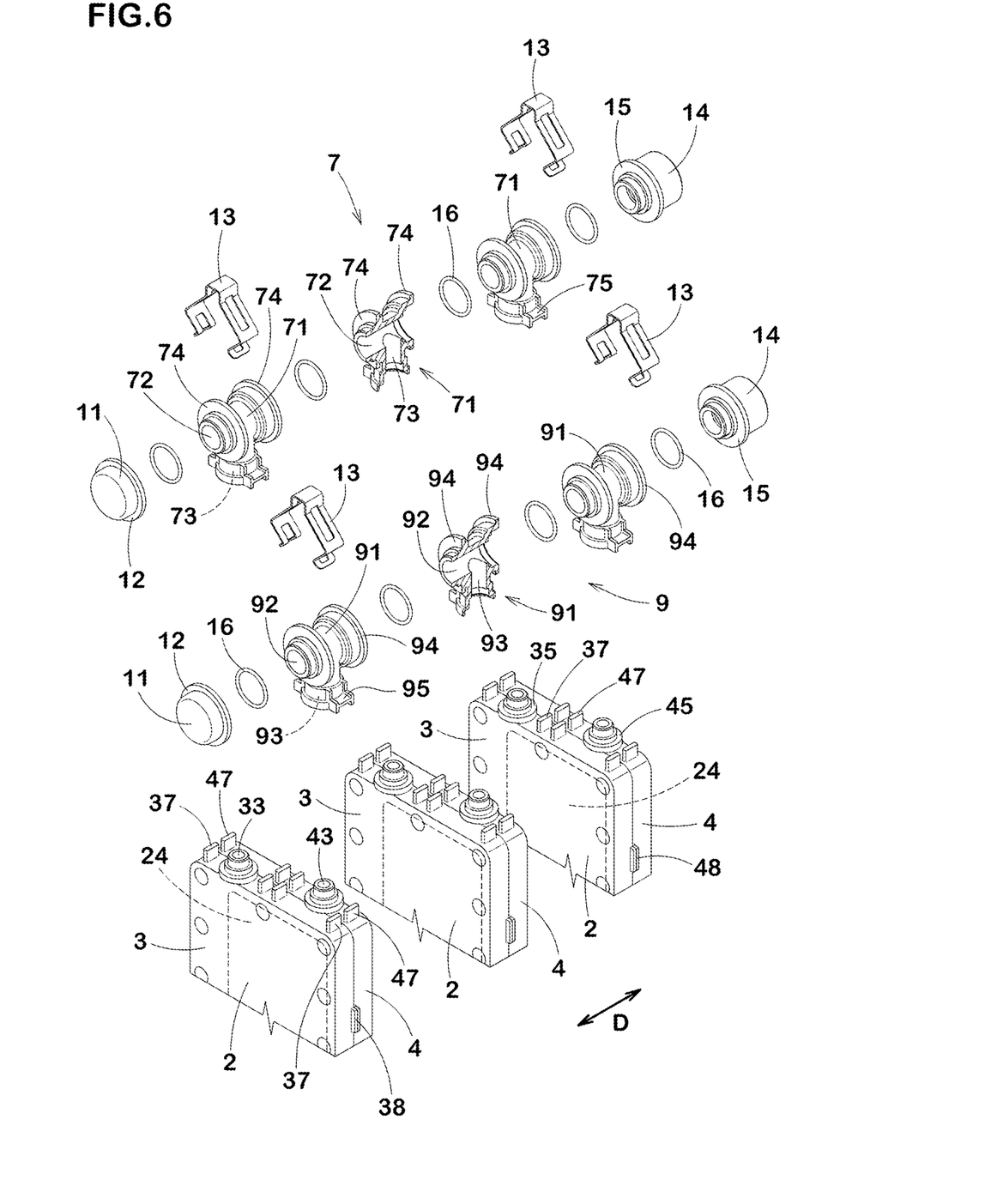
FIG. 6 shows exploded views of a first discharge pipe and a second discharge pipe.

FIG. 6 illustrates the configuration of a first discharge pipe 7 and a second discharge pipe 9 disposed at an upper part of the electrolytic unit 1. In the drawing, an embodiment is shown in which three electrolytic cells 2 are stacked.

As depicted in FIGS. 2 and 6, the first discharge ports 33 of the electrolytic cells 2 are made communicating with one another by the first discharge pipe 7 extending in the normal direction (D) of the diaphragm 24. The first discharge pipe 7 is composed of a plurality of second pipe pieces 71 connected together in the normal direction (D).

The configuration of the second pipe pieces 71 is similar to that of the first pipe pieces 61. That is, each of the second pipe pieces 71 has a main body part 72 and a branch part 73. The main body part 72 is provided at both ends in the normal direction (D) with flanges 74 and by the flanges 74 of adjacent second pipe pieces 71 being in contact with each other, the second pipe pieces 71 are connected together to form the first discharge pipe 7. The first discharge pipes 7 is connected with the first case pieces 3 so that the interior of each branch part 73 communicates with a respective one of the first discharge ports 33.

To one end of the first discharge pipe 7, the lid member 11 is attached, and fixed to the second pipe piece 71 by the clip 13. To the other end of the first discharge pipe 7, the joint member 14 for connecting the first discharge pipe 7 with a pipe leading to an electrolytic water supply destination is attached, and fixed to the second pipe piece 71 by the clip 13.

As depicted in FIGS. 2 and 5, the second supply ports 42 of the electrolytic cells 2 are made communicating with one another by the second supply pipe 8 extending in the normal direction (D) of the diaphragm 24. The second supply pipe 8 is composed of a plurality of third pipe pieces 81 connected together in the normal direction (D).

The configuration of the third pipe pieces 81 is similar to that of the first pipe pieces 61. That is, each of the third pipe piece 81 has a main body part 82 and a branch part 83. The main body part 82 is provided at both ends in the normal direction (D) with flanges 84, and by the flanges 84 of adjacent third pipe pieces 81 being in contact with each other, the third pipe pieces 81 are connected together to form the second supply pipe 8. The second supply pipe 8 is connected with the second case pieces 4 so that the interior of each branch part 83 communicates with a respective one of the second supply ports 42.

To one end of the second supply pipe 8, the lid member 11 is attached, and fixed to the third pipe piece 81 by the clip 13. To the other end of the second supply pipe 8, the joint member 14 for connecting the second supply pipe 8 to a pipe extending from the water supply source is attached, and fixed to the third pipe piece 81 by the clip 13.

As depicted in FIGS. 2 and 6, the second discharge ports 43 of the electrolytic cells 2 are made communicating with one another by the second discharge pipe 9 extending in the normal direction (D) of the diaphragm 24. The second discharge pipe 9 is composed of a plurality of fourth pipe pieces 91 connected together in the normal direction (D).

The configuration of the fourth pipe pieces 91 is similar to that of the second pipe pieces 71. That is, each of the fourth pipe pieces 91 has a main body part 92 and a branch part 93. The main body part 92 is provided at both ends in the normal direction (D) with flanges 94, and by the flanges 94 of adjacent fourth pipe pieces 91 being in contact with each other, the fourth pipe pieces 91 are connected together to form the second discharge pipe 9. The second discharge pipe 9 is attached to the second case pieces 4 so that the interior of each of the branch parts 93 communicates with a respective one of the second discharge ports 43.

The first supply pipe 6, the anode chambers 21 in one electrolytic unit 1 are connected in parallel and, by the first discharge pipe 7, the cathode chambers 22 in one electrolytic unit 1 are connected in parallel. Thereby, it is possible that a large amount of electrolytic water is produced in a short period of time.

Each of the first case piece 3 is provided with a respective one of the first pipe pieces 61 and a respective one of the second pipe pieces 71. Each of the second case piece 4 is provided with a respective one of the third pipe pieces 81 and a respective one of the fourth pipe pieces 91. Therefore, by increasing or decreasing the first pipe pieces 61 in accordance with the number of the electrolytic cells 2 forming the electrolytic unit 1, it is possible that the length of the first supply pipe 6 is freely adjusted, thereby, the first supply pipe 6 is configured easily and inexpensively.

The first pipe pieces 61, the second pipe pieces 71, the third pipe pieces 81, and the fourth pipe pieces 91 are molded into the same shape by a synthetic resin material, for example. Therefore, it is possible that the first supply pipes 6, the first discharge pipes 7, the second supply pipes 8, and the second discharge pipes 9 are inexpensively manufactured.

By electrolyzing water in each of the electrolytic cells 2, hydrogen gas is produced in each of the cathode chambers 22 and oxygen gas is produced in each of the anode chambers 21, therefore, the internal pressure is increased in each of the cathode chambers 22 and the anode chambers 21, thereby, a large water pressure is applied to the back surface of each of the first case pieces 3 and the back surface of each of the second case pieces 4.

As depicted in FIG. 2, it is preferred that a first reinforcing member 52 is attached to the back surface (outer end face) of the first case piece 3 on one end side in the normal direction (D) (left front side in the drawing) and the back surface (outer end face) of the second case piece 4 on the other end side in the normal direction (D). The first reinforcing member 52 of the present embodiment is formed in a plate shape by processing a metal such as stainless steel, for example, into a sheet metal. The first reinforcing members 52 are disposed in parallel to the diaphragms 24, and fixed to the first case piece 3 and the second case piece 4 by the bolts 51. By the first reinforcing members 52, the first case piece 3 on the one end side and the second case piece 4 on the other end side are reinforced, therefore, expansion of the first case piece 3 and the second case piece 4 due to water pressure is suppressed.

Furthermore, in the present embodiment, it is preferred that a second reinforcing member 53 extending in the short-length direction of the first case piece 3 and the second case piece 4 is disposed outside of each of the first reinforcing members 52. The second reinforcing member 53 is formed of a metal thicker than the first reinforcing member 52, for example. The second reinforcing member 53 may be formed with female screws corresponding to the bolts 51. By the second reinforcing members 53, expansion of the first case piece 3 and the second case piece 4 due to water pressure is further suppressed.

In the present embodiment, the first reinforcing member 52 and the second reinforcing member 53 are omitted between the first case piece 3 and the second case piece 4 arranged in a back-to-back manner between the electrolytic cells 2 adjacent to each other in the normal direction (D). The reason for this is that the water pressure applied to the outer end face of the first case piece 3 and the water pressure applied to the outer end face of the second case piece 4 are cancelled out.

In the present embodiment, it is preferred that the first supply pipe 6 and the first discharge pipe 7 are fixed to the first case piece 3 by first fixing members 55. The first fixing members 55 press to fix each of the first pipe pieces 61 and each of the second pipe pieces 71 to a respective one of the first case pieces 3. As the first fixing members 55, for example, metal angle materials extending in the normal direction (D) and having an L-shaped cross section are applied. By the first fixing members 55 configured as such, it is possible that the plurality of the first pipe pieces 61 and the second pipe pieces 71 are firmly fixed to the first case pieces 3 with a simple configuration and are pressed to the first case pieces 3 against the water pressure in the anode chambers 21 and so forth.

The first fixing members 55 of the present embodiment are fixed to the first reinforcing members 52 at both end parts thereof in the normal direction (D). That is, the first fixing members 55 are fixed to the first reinforcing members 52 by fastening bolts 57 (see FIG. 1) or the like. Thereby, it is possible that the first supply pipe 6 and the first discharge pipe 7 are firmly fixed to the first case pieces 3 with a simple structure.

Further, it is preferred that the second supply pipe 8 and the second discharge pipe 9 are fixed to the second case pieces 4 by second fixing members 56. Since details of the second fixing members 56 are equivalent to those of the first fixing members 55, description thereof is omitted.

At a tip of the branch part 63 of each of the first pipe pieces 61, a flange 65 protruding outward from the branch part 63 is formed. Similarly, a flange 75 is formed at a tip of the branch part 73 of each of the second pipe pieces 71, a flange 85 is formed at a tip of the branch part 83 of each of the third pipe pieces 81, and a flange 95 is formed at a tip of the branch part 93 of each of the fourth pipe pieces 91.

Figure 7:
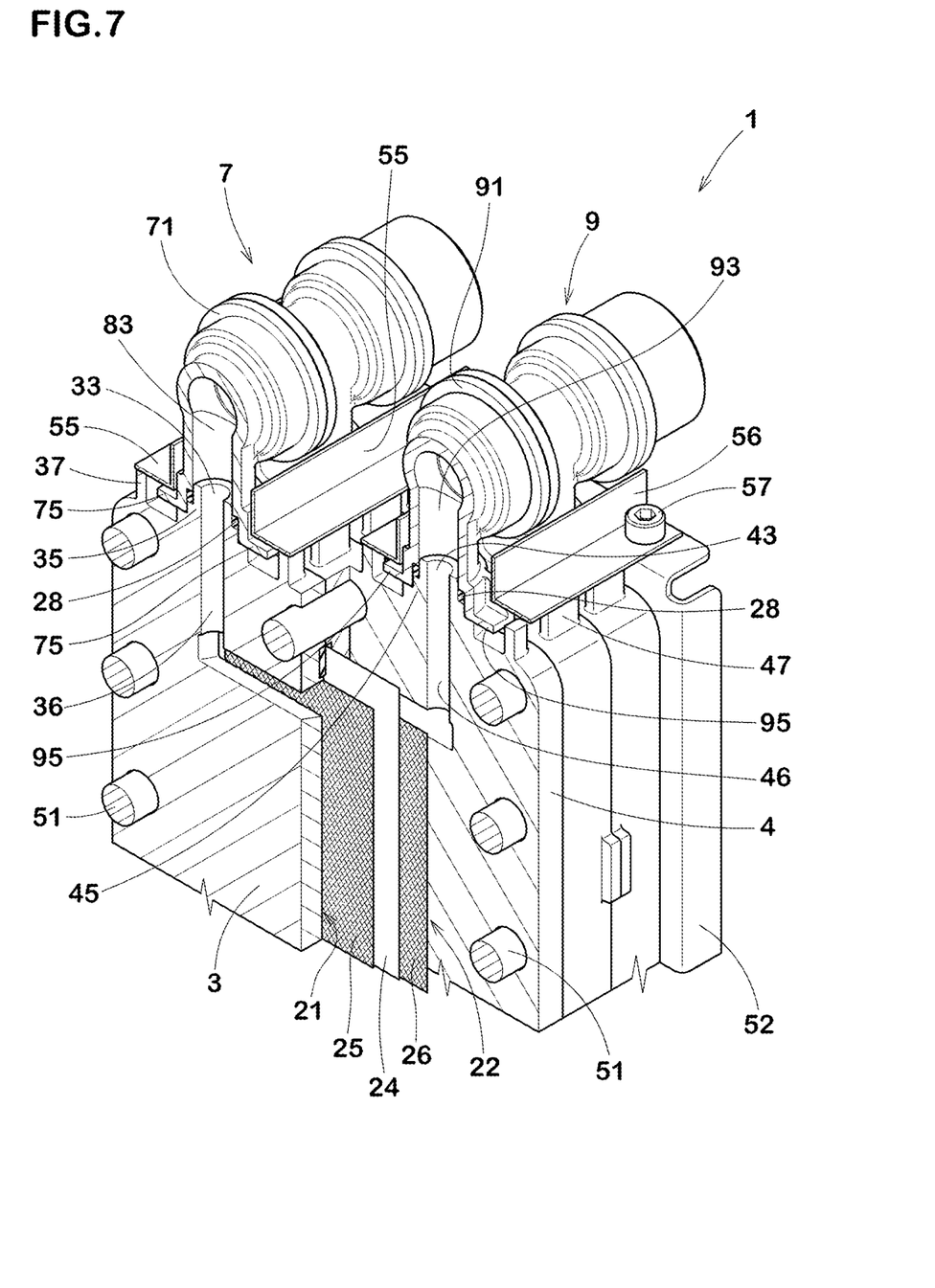
FIG. 7 is a perspective view of the electrolytic unit with part of a first case piece, a second case piece, a second pipe piece, and a fourth pipe piece cut away.

FIG. 7 is a perspective view of the electrolytic unit 1, with part of the first case piece 3, the second case piece 4, the second pipe piece 71, and the fourth pipe piece 91 cut away. In the following, with reference to FIG. 7, the installation structure of the second pipe pieces 71 and the fourth pipe pieces 91 will be mainly described, but the installation structure of the first pipe pieces 61 and the third pipe pieces 81 is also the same as that of the second pipe pieces 71 and so forth.

Each of the first case pieces 3 of the present embodiment is formed with a protruding part 35 protruding toward the first discharge pipe 7 from the side wall opposed to the first discharge pipe 7 (side wall extending in the short-length direction). The first discharge port 33 is provided at a tip of the protruding part 35, therefore, the first case piece 3 is formed with a discharge pipe 36 penetrating from the anode chamber 21 through the protruding part 35 to the first discharge port 33.

The second pipe pieces 71 are each attached so that the tip of the branch part 73 is in contact with the protruding part 35 of a respective one of the first case pieces 3, and then the flange 75 is pressed and fixed to the protruding part 35 of the first case piece 3 by the first fixing member 55. It should be noted that a sealing member 28 for preventing water leakage is provided between the protruding part 35 and the second pipe piece 71.

On both sides of the protruding part 35, protrusions 37 protruding from the side wall of each of the first case pieces 3 are formed. The protrusions 37 on each side are arrayed along the normal direction (D) so as to be opposed to the first fixing member 55 when the electrolytic cells 2 are stacked.

When the first fixing member 55 is attached to the first reinforcing member 52, the protrusions 37 come into contact with the lower surface of the first fixing member 55. When the electrolytic chambers 20 and so forth are filled with water, the second pipe pieces 71 receive a force in the direction away from the first case pieces 3 (upward direction in FIG. 7) due to the water pressure from the anode chambers 21, the discharge pipes 36, and so forth, and the first fixing member 55 is subjected to a moment. In the present embodiment, since the protrusions 37 are in contact with the first fixing member 55, deformation of the first fixing member 55 is suppressed, therefore, water leakage between the protruding parts 35 and the second pipe pieces 71 is effectively suppressed.

Similarly, each of the second case piece 4 of the present embodiment is formed with a protruding part 45, a discharge pipe 46, and protrusion 47. The fourth pipe piece 91 is attached so that the tip of the branch part 93 is in contact with the protruding part 45 of the second case piece 4, and the flange 75 is pressed and fixed to the second case piece 4 by the first fixing member 55. When the second fixing member 56 is attached to the first reinforcing member 52, the protrusions 47 are in contact with the second fixing member 56. Therefore, deformation of the second fixing member 56 due to the water pressure of the electrolytic chamber 20 and so forth is suppressed, thereby, water leakage between the protruding parts 45 and the fourth pipe pieces 91 is effectively suppressed.

As depicted in FIG. 5, the protruding part 35 is also formed to protrude toward the first supply pipe 6 from a side surface of each of the first case pieces 3 opposed to the first supply pipe 6. The first supply port 32 is provided at a tip of the protruding part 35. On both sides of this protruding part 35, protrusions 37 protruding from the side wall of the first case piece 3 are formed. When the first fixing member 55 is attached to the first reinforcing member 52, the protrusions 37 are in contact with the first fixing member 55, therefore, deformation of the first fixing member 55 is suppressed, thereby, water leakage between the protruding parts 35 and the first pipe pieces 61 is effectively suppressed.

Similarly, the protruding part 45 is also formed to protrude toward the second supply pipe 8 from the side surface of each of the second case pieces 4 opposed to the second supply pipe 8. The second supply port 42 is provided at a tip of the protruding part 45. On both sides of this protruding part 45, protrusions 47 protruding from the side wall of the second case piece 4 are formed. When the second fixing member 56 is attached to the first reinforcing member 52, the protrusions 47 are in contact with the second fixing member 56, therefore, deformation of the second fixing member 56 is suppressed, thereby, water leakage between the protruding parts 45 and the third pipe pieces 81 is effectively suppressed.

In the present embodiment, the protrusions 37 of the first case pieces 3 are disposed at positions adjacent to the protrusions 47 of the second case pieces 4 in the normal direction (D). Thereby, deformation of the first fixing member 55 is further suppressed, and water leakage between the protruding parts 35, and the first pipe pieces 61 and the second pipe pieces 71 is further suppressed. Also, the protrusions 47 of the second case pieces 4 are disposed at positions adjacent to the protrusions 37 of the first case pieces 3 in the normal direction (D). Therefore, deformation of the second fixing member 56 is further suppressed, and water leakage between the protruding parts 45, and the third pipe pieces 81 and the fourth pipe pieces 91 is further suppressed.

Each of the first case pieces 3 and the second case pieces 4 may be provided with a protrusion 38 and a protrusion 48, respectively, on a side wall thereof. For example, the protrusion 38 is formed on the side wall not provided with the first supply port 32 and the first discharge port 33 (side wall extending in the longitudinal direction) of each of the first case pieces 3, and the protrusion 48 is formed on the side wall not provided with the second supply port 42 and the second discharge port 43 of each of the second case piece 4. The protrusions 38 and 48 provided at such positions do not inhibit the stacking of the electrolytic cells 2.

The protrusion 38 and the protrusion 48 are disposed at positions where they are adjacent and opposed to each other when the first case piece 3 and the second case piece 4 are arranged in a face-to-face manner. The protrusions 38 and 48 are used for temporary assembly of the electrolytic cells 2. For example, with the protrusions 38 and 48 held with a clip (not shown) or the like, misalignment and the like of the second case piece 4 with respect to the first case piece 3 is suppressed. After the electrolytic cells 2 temporarily assembled are stacked and fixed together by the bolts 51, the above-described clips attached to the protrusions 38 and 48 may be removed.

While detailed description has been made of the electrolytic unit 1 of the present invention, the present invention can be embodied in various forms without being limited to the illustrated embodiment. That is, it suffices as long as the electrolytic unit 1 includes at least a plurality of electrolytic cells 2 for electrolyzing water, wherein each of the electrolytic cells 2 includes a case 23 for defining an electrolytic chamber 20 therein and a diaphragm 24 for dividing the electrolytic chamber 20 into an anode chamber 21 on an anode side and a cathode chamber 22 on a cathode side, and the plurality of the electrolytic cells 2 forms a stack 5 in which the electrolytic cells 2 are stacked in a normal direction (D) of the diaphragms 24 with the orientations of the diaphragms 24 aligned with each other.

For example, the diaphragms 24 are not limited to the form consisting of a solid polymer electrolyte membrane as described above, and may be changed depending on the intended use of the electrolytic water production device. More specifically, when the electrolytic water production device is used for spraying or irrigating electrolytic water in the field of agriculture, polytetrafluoroethylene (PTFE) hydrophilic membranes may be applied to the diaphragms 24. In accordance with this, the shapes of the first case pieces 3 and the second case pieces 4, the arrangement of the anode power feeders 25 and the cathode power feeders 26, and so forth may be changed as appropriate.

Further, the first supply pipe 6, the first discharge pipe 7, the second supply pipe 8, and the second discharge pipe 9 are not limited to the configurations described above, and can be changed as appropriate.

DESCRIPTION OF THE REFERENCE SIGNS 1 electrolytic unit
2 electrolytic cells
3 first case piece
4 second case piece
5 stack
6 first supply pipe
7 first discharge pipe
8 second supply pipe
9 second discharge pipe
20 electrolytic chamber
21 anode chamber
22 cathode chamber
23 case
24 diaphragm
32 first supply port
33 first discharge port
42 second supply port
43 second discharge port
51 bolt
52 first reinforcing member
55 first fixing member
56 second fixing member
61 first pipe piece
71 second pipe piece
81 third pipe piece
91 fourth pipe piece
D normal direction

The invention claimed is:

1. An electrolytic unit comprising:
a plurality of electrolytic cells for electrolyzing water; and
a first fixing member, wherein
each of the electrolytic cells includes a case for defining an electrolytic chamber therein and a diaphragm for dividing the electrolytic chamber into an anode chamber on an anode side and a cathode chamber on a cathode side,
the plurality of the electrolytic cells forms a stack in which the electrolytic cells are stacked in a normal direction of the diaphragms with the orientations of the diaphragms aligned with each other,
the case of each of the electrolytic cells includes a first case piece for defining the anode chamber and a second case piece for defining the cathode chamber,
each of the first case pieces of the cases of the electrolytic cells has formed therein a first supply port for supplying water for electrolysis to the anode chamber and a first discharge port for taking out electrolyzed water from the anode chamber,
the first supply ports are arranged on a straight line extending in the normal direction,
the first discharge ports are disposed on a straight line extending in the normal direction,
each of the first supply ports is communicated with one another by a first supply pipe extending in the normal direction,
the first supply pipe is composed of a plurality of first pipe pieces connected in the normal direction,
the first pipe pieces are attached to the first case pieces on a one-to-one basis and each communicated with a respective one of the first supply ports,
each of the first discharge ports is communicated with one another by a first discharge pipe extending in the normal direction,
the first discharge pipe is composed of a plurality of second pipe pieces connected in the normal direction,
the second pipe pieces are attached to the first case pieces on a one-to-one basis and each communicated with a respective one of the first discharge ports, and
the first fixing member extends in the normal direction and fixes the first pipe pieces and the second pipe pieces to the first case pieces by pressing each of the first pipe pieces onto a respective one of the first case pieces in a direction perpendicular to the normal direction and pressing each of the second pipe pieces onto a respective one of the first case pieces in a direction perpendicular to the normal direction.

2. The electrolytic unit according to claim 1, wherein the cases of the plurality of the electrolytic cells are in contact with each other.

3. The electrolytic unit according to claim 1, wherein the electrolytic cells are integrally are integrally fixed together by bolts penetrating through the electrolytic cells in the normal direction.

4. The electrolytic unit according to claim 1, wherein
in each pair of the electrolytic cells adjacent to each other in the normal direction, the first case piece of one of the electrolytic cells and the second case piece of the other one of the electrolytic cells are fixed to each other.

5. The electrolytic unit according to claim 1, wherein
each of the second case pieces has formed therein a second supply port for supplying water for electrolysis to the cathode chamber and a second discharge port for taking out electrolyzed water from the cathode chamber,
the second supply ports are arranged on a straight line extending in the normal direction, and
the second discharge ports are arranged on a straight line extending in the normal direction.

6. The electrolytic unit according to claim 5, wherein
each of the second supply ports is communicated with one another by a second supply pipe extending in the normal direction,
the second supply pipe is composed of a plurality of third pipe pieces connected in the normal direction, and
the third pipe pieces are attached to the second case pieces on a one-to-one basis and each communicated with a respective one of the second supply ports.

7. The electrolytic unit according to claim 6, wherein
each of the second discharge ports is communicated with one another by a second discharge pipe extending in the normal direction,
the second discharge pipe is composed of a plurality of fourth pipe pieces connected in the normal direction, and
the fourth pipe pieces are attached to the second case pieces on a one-to-one basis and each communicated with a respective one of the second discharge ports.

8. The electrolytic unit according to claim 7, further comprising a second fixing member extending in the normal direction and pressing to fix each of the third pipe pieces and each of the fourth pipe pieces to a respective one of the second case pieces.

9. The electrolytic unit according to claim 8, wherein the second fixing member fixes the third pipe pieces and the fourth pipe pieces to the second case pieces by pressing the third pipe pieces onto the second case pieces in a direction perpendicular to the normal direction and the fourth pipe pieces onto the second case pieces in a direction perpendicular to the normal direction.

10. The electrolytic unit according to claim 8, wherein the second fixing member has an L-shaped cross section.

11. The electrolytic unit according to claim 1, wherein
reinforcing members are each attached to an outer end face of outermost one of the first case pieces on one side in the normal direction and an outer end face of outermost one of the second case pieces on the other side in the normal direction.

12. The electrolytic unit according to claim 11, wherein
each of the reinforcing members include a first reinforcing member and a second reinforcing member,
the first reinforcing member is formed of a metal in a plate shape and disposed in parallel to the diaphragms, and
the second reinforcing member is formed of a metal thicker than the first reinforcing member and disposed outside the first reinforcing member in the normal direction in each of the reinforcing members.

13. The electrolytic unit according to claim 12, wherein
each of the reinforcing member includes a plurality of the second reinforcing members, and
the second reinforcing members each extend in a first direction perpendicular to the normal direction and arranged at intervals in a second direction perpendicular to the normal direction and the first direction.

14. The electrolytic unit according to claim 1, wherein
each of the first pipe pieces has a main body part extending in the normal direction and a branch part extending in parallel to an in-plane direction of the diaphragms,
the main body part and the branch part are each formed in a pipe shape and communicate with each other in each of the first pipe pieces, and
the branch part of each of the first supply pipes is attached to the first supply port of a respective one of the first case pieces.

15. The electrolytic unit according to claim 1, wherein the first fixing member has an L-shaped cross section.

16. An electrolytic unit comprising:
a plurality of electrolytic cells for electrolyzing water; and reinforcing members, wherein
each of the electrolytic cells includes a case for defining an electrolytic chamber therein and a diaphragm for dividing the electrolytic chamber into an anode chamber on an anode side and a cathode chamber on a cathode side,
the plurality of the electrolytic cells forms a stack in which the electrolytic cells are stacked in a normal direction of the diaphragms with the orientations of the diaphragms aligned with each other,
the case includes a first case piece for defining the anode chamber and a second case piece for defining the cathode chamber,
each of the first case pieces has formed therein a first supply port for supplying water for electrolysis to the anode chamber and a first discharge port for taking out electrolyzed water from the anode chamber,
the first supply ports are arranged on a straight line extending in the normal direction,
the first discharge ports are disposed on a straight line extending in the normal direction,
each of the first supply ports is communicated with one another by a first supply pipe extending in the normal direction,
the first supply pipe is composed of a plurality of first pipe pieces connected in the normal direction,
the first pipe pieces are attached to the first case pieces on a one-to-one basis and each communicated with a respective one of the first supply ports,
the reinforcing members are each attached to an outer end face of outermost one of the first case pieces on one side in the normal direction and an outer end face of outermost one of the second case pieces on the other side in the normal direction,
each of the reinforcing members include a first reinforcing member and a second reinforcing member,
the first reinforcing member is formed of a metal in a plate shape and disposed in parallel to the diaphragms, and
the second reinforcing member is formed of a metal thicker than the first reinforcing member and disposed outside the first reinforcing member in the normal direction in each of the reinforcing members.

\* \* \* \* \*